United States Patent
Ohtomo et al.

(12)

(10) Patent No.: US 6,286,607 B1
(45) Date of Patent: Sep. 11, 2001

(54) CONSTRUCTION MACHINE CONTROL SYSTEM

(75) Inventors: Fumio Ohtomo; Kunihiro Hayashi, both of Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 09/429,139

(22) Filed: Oct. 28, 1999

(30) Foreign Application Priority Data

Nov. 13, 1998 (JP) .......................................... 323474

(51) Int. Cl.$^7$ ...................................................... E02F 3/76
(52) U.S. Cl. .............................................. 172/4.5; 356/147
(58) Field of Search .................................. 172/4.5, 2, 3, 4, 172/810, 819; 37/348, 382; 701/50; 356/147, 152

(56) References Cited

U.S. PATENT DOCUMENTS

| | | | |
|---|---|---|---|
| 4,273,196 | | 6/1981 | Etsusaki et al. ........................ 172/4.5 |
| 4,807,131 | | 2/1989 | Clegg ................................ 364/424.01 |
| 5,100,229 | * | 3/1992 | Lundberg et al. ................ 172/4.5 X |
| 5,546,093 | * | 8/1996 | Gudat et al. .......................... 342/357 |
| 5,600,436 | * | 2/1997 | Gudat ................................ 172/4.5 X |
| 5,950,141 | * | 9/1999 | Yamamoto et al. ................ 701/50 X |
| 5,996,702 | * | 12/1999 | Hall ....................................... 172/4.5 |
| 6,047,227 | * | 4/2000 | Henderson et al. ................... 701/50 |
| 6,048,105 | * | 4/2000 | Ohtomo et al. ........................ 385/88 |
| 6,052,181 | * | 4/2000 | Maynard et al. ..................... 356/147 |
| 6,068,060 | * | 5/2000 | Ohtomo et al. ....................... 172/4.5 |

* cited by examiner

*Primary Examiner*—Victor Batson
(74) *Attorney, Agent, or Firm*—Nields & Lemack (57) ABSTRACT

The present invention provides a construction machine control system, which comprises a rotary laser irradiating system for irradiating a plurality of laser beams by separating in a vertical direction and for forming a plurality of laser beam reference planes by the plurality of laser beams, a construction machine having a ground leveling tool, a level sensor arranged on the ground leveling tool and for receiving and detecting the laser beams, a driving unit for driving the ground leveling tool to adjust height thereof, a control device for controlling the driving unit, and a GPS receiving system for detecting a position of the construction machine, wherein the control device detects the position of the construction machine by the GPS receiving system, the level sensor selects at least one of the plurality of laser beams and controls the driving unit based on a laser beam photodetecting position of the level sensor.

10 Claims, 11 Drawing Sheets

BEAM DIVIDING STATUS

FIG. 14(B)

PHOTODETECTION SIGNAL

CONSTRUCTION MACHINE CONTROL SYSTEM

BACKGROUND OF THE INVENTION

The present invention relates to a construction machine control system when a construction machine is operated for construction work using a rotary laser irradiating system for forming a reference plane for construction work such as ground leveling operation, and in particular, to a construction machine control system using a laser reference plane formed by rotary irradiation of laser beam for the control of height for ground leveling.

When ground leveling operation for preparing a projected housing area or for paving roads is performed using construction machines such as graders, bulldozers, etc., it is necessary to have a reference for detecting position of the construction machines or for determining height of ground leveling. In recent years, a construction machine control system has been introduced for practical use, which measures and detects ground leveling position of the construction machine by GPS (global positioning system) and uses laser beams to determine height as a reference for ground leveling operation. To form a reference plane for height as described above, a construction machine control system using a rotary laser irradiating system is employed.

Figure 15:
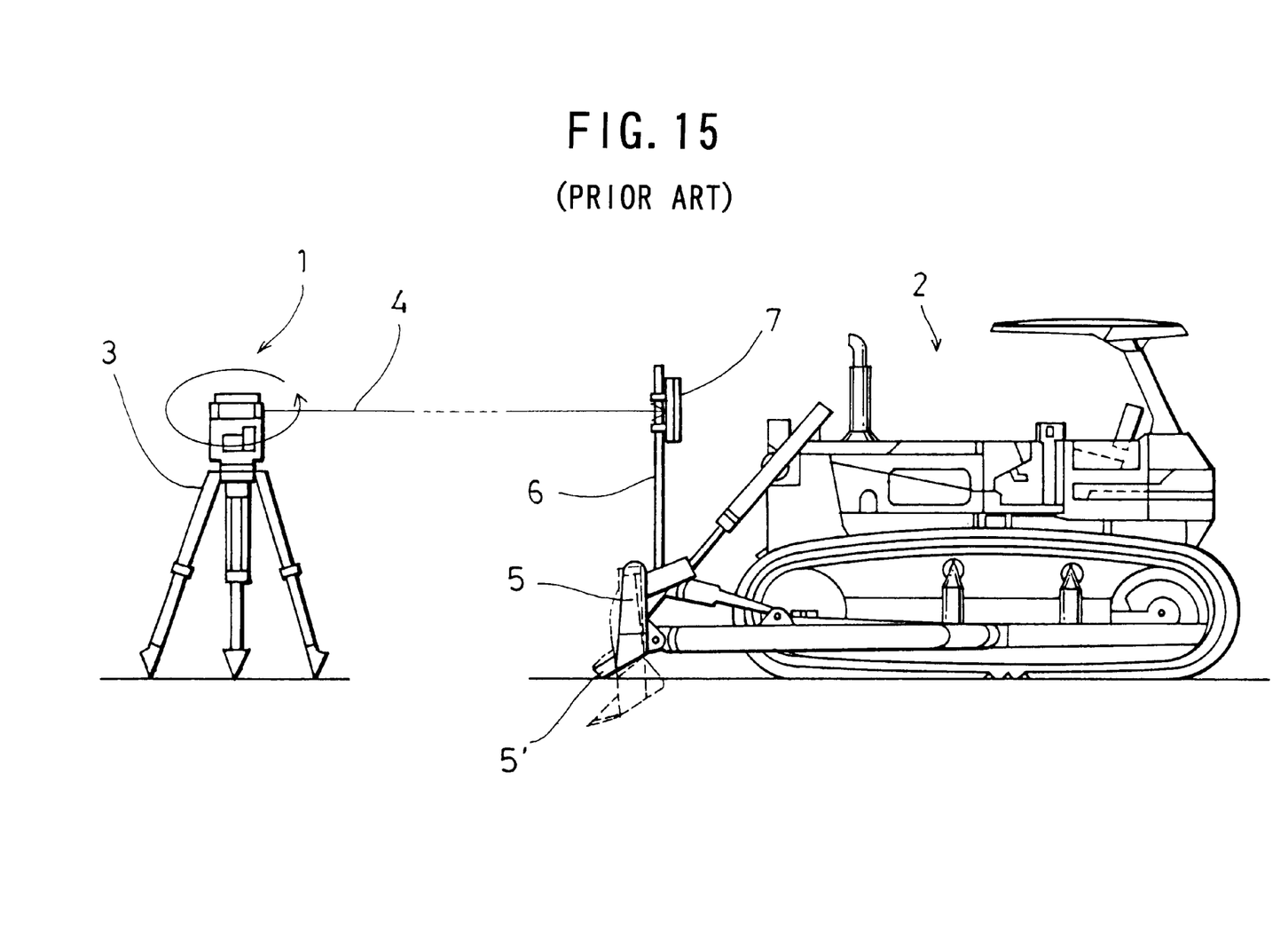
FIG. 15 is a drawing to explain a conventional type construction machine control system.

FIG. 15 shows a case where this construction machine control system is adopted for a bulldozer.

In FIG. 15, reference numeral 1 represents a rotary laser irradiating system, and 2 represents a bulldozer. The rotary laser irradiating system 1 is installed via a tripod 3 at a predetermined position of a projected housing area. The rotary laser irradiating system 1 projects laser beam 4 in a horizontal direction and rotates the beams, and a reference plane is formed by the laser beam 4.

The bulldozer 2 is equipped with a blade 5, which is supported in such manner that it can be moved up or down. A pole 6 is erected on the blade 5, and a level sensor 7 is mounted on the pole 6. The level sensor 7 receives the laser beam 4 from the rotary laser irradiating system 1 and detects photodetecting position. The bulldozer 2 is provided with a control device (not shown), which detects position of the height of the blade 5 based on a photodetection signal from the level sensor 7 and controls height of the blade 5 according to the result of the detection.

As described above, a horizontal reference plane is formed by the laser beam 4, and ground can be leveled in the horizontal direction by keeping a constant distance between the horizontal reference plane and a blade edge 5' of the blade 5. Also, it is possible to change height of the ground surface to be leveled by changing the distance to the blade edge 5'.

Figure 16:
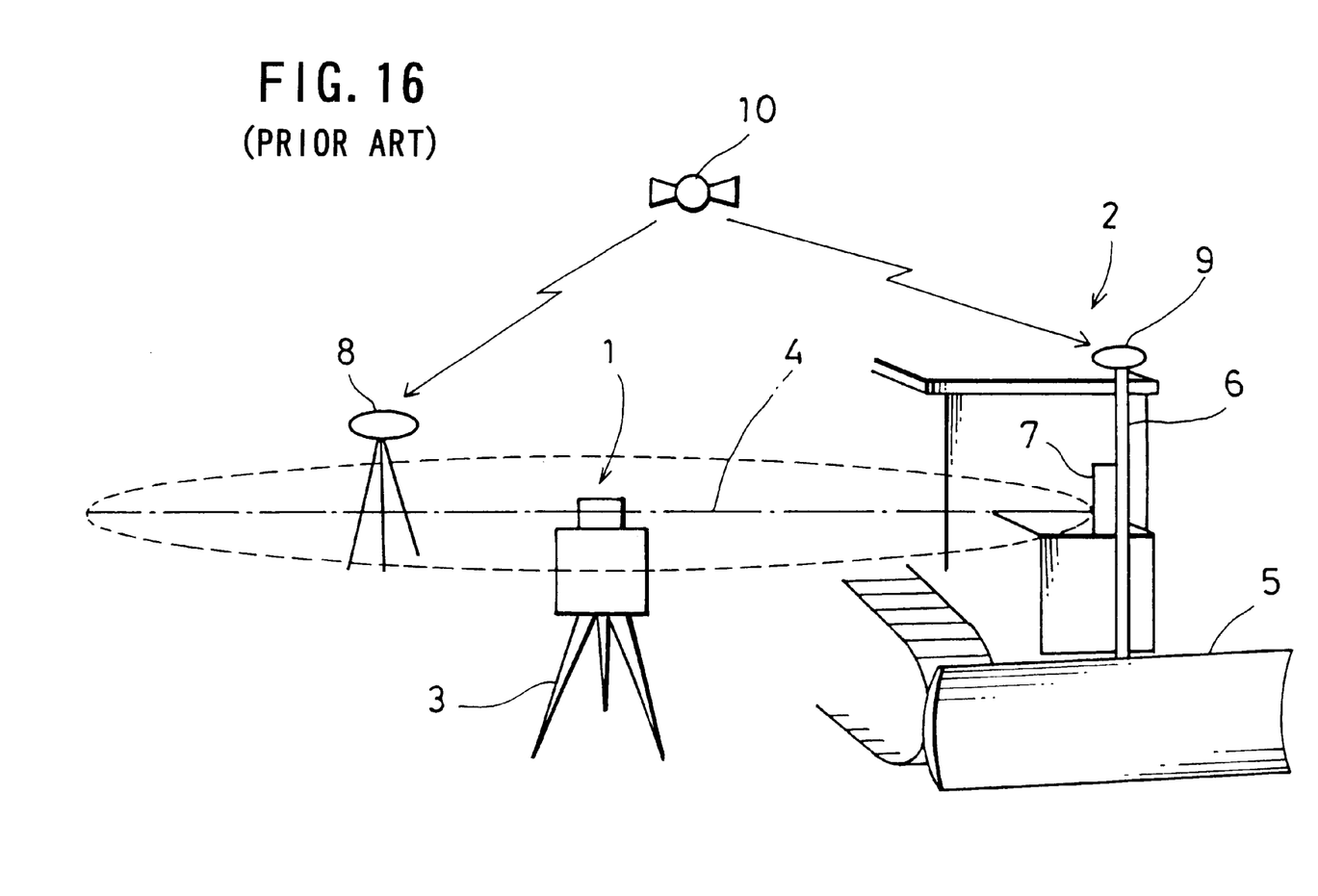
FIG. 16 is a drawing to explain a conventional type construction machine control system.

Rough description is now given on a GPS system for measuring position of the bulldozer 2 referring to FIG. 16.

A GPS base antenna 8 is installed at a known position, and a GPS antenna 9 is erected on the bulldozer 2. The GPS base antenna 8 and the GPS antenna 9 receive signals from an artificial satellite 10 respectively and detect positions. By comparing the two positions thus detected, working position of the bulldozer 2 with respect to the GPS base antenna 8 at the known point is calculated, and ground leveling operation is performed for a predetermined range.

At a construction site of relatively smaller scale, only one construction machine is used, while a plurality of construction machines are generally used at the same time at construction site. Further, when a plurality of construction machines are used for construction work, height of ground leveling also may differ for each construction machine. Therefore, there is a problem in that a rotary laser irradiating system is required for level setting for each of the plurality of construction machines. When a plurality of rotary laser irradiating systems are operated, the construction machine on the receiving side may recognize a plurality of laser beam reference planes, and this often leads to erroneous operation.

To ensure simultaneous control of a plurality of construction machines without causing erroneous operation, it is preferable to perform level setting using a single rotary laser irradiating system. In order to perform level setting using a single rotary laser irradiating system for each of construction machines, it is necessary to perform level setting for each of the construction machines during one rotation of the laser beam. Conventionally, laser beam is irradiated by rotary irradiation from an optical head, which is rotated at several hundreds of rpm to set a reference plane or a reference line. Also, for the setting of level and inclination, tilting mechanism for tilting the optical head is provided.

However, in the tilting mechanism as described above, it is impossible to adjust at high speed in a vertical direction such as level setting in a plurality of directions during one rotation of the laser beam. In this respect, a construction machine control system is not yet used in practical application, which uses a single rotary laser irradiating system to control ground leveling operation for a plurality of construction machines.

Further, ground leveling operation is not always limited to the preparation of horizontal ground surface. Rather, leveling operation must be performed for preparation of inclined surface in many cases. In the construction work for preparing a projected housing area, it is necessary to provide gradient for water drainage. For road paving work, gradient suitable for topographical condition and gradient for water drainage must be provided. In a conventional type construction machine control system, a horizontal ground surface is prepared at first, and an inclined ground surface is then prepared with a predetermined gradient according to the result of survey operation.

The horizontal ground surface can be prepared by the construction machine control system as described above without requiring skill of the operator, while it is very difficult and requires skilled operator to provide gradient to the ground surface. Finishing condition of the ground leveling of inclined ground surface depends much on the skilled technique of operator. Progress of the work also depends on the skill of the operator, and this involves the problem of completion time and process control. There is also a case where horizontal ground surfaces with different levels must be prepared at the same construction site. In such case, complicated procedure is required and level setting for a reference plane formed by rotary laser irradiation must be repeatedly performed.

SUMMARY OF THE INVENTION

It is an object of the present invention to provide a construction machine control system, by which it is possible to perform level setting for a plurality of working ranges using a single rotary laser irradiating system, to control a plurality of construction machines using a single rotary laser irradiating system, and also to perform ground leveling operation for preparing inclined ground surface or a plurality of horizontal ground surfaces with different levels without requiring skill of experienced operator and in easy and reliable manner.

The construction machine control system according to the present invention comprises a rotary laser irradiating system for irradiating a plurality of laser beams by separating in a vertical direction and for forming a plurality of laser beam reference planes by the plurality of laser beams, a construction machine having a ground leveling tool, a level sensor arranged on the ground leveling tool and for receiving and detecting the laser beams, a driving unit for driving the ground leveling tool to adjust height thereof, a control device for controlling the driving unit, and a GPS receiving system for detecting a position of the construction machine, wherein the control device detects the position of the construction machine by the GPS receiving system, the level sensor selects at least one of the plurality of laser beams and controls the driving unit based on a laser beam photodetecting position of the level sensor. Also, the present invention provides a construction machine control system as described above, wherein there is further provided topographical data incorporated in the control device and used for construction work, the control device associates the position of the construction machine and the position of the rotary irradiating system detected by the GPS receiving system with the topographical data, the level sensor selects at least one of the plurality of laser beams and controls the driving unit based on the topographical data at the position of the construction machine and on the laser beam photodetecting position of the level sensor. Further, the present invention provides a construction machine control system as described above, which further comprises a mobile side GPS receiving system for detecting a position of the construction machine, a fixed side GPS receiving system for detecting a position of the rotary laser irradiating system, transmitting means provided on the fixed side GPS receiving system and for transmitting a result of receiving on the fixed side GPS receiving system to the construction machine, and receiving means provided on the construction machine and for receiving transmission from the transmitting means. Also, the present invention provides a construction machine control system as described above, wherein each of the plurality of laser beams is modulated in a different manner. Further, the present invention provides a construction machine control system as described above, wherein each of the laser beams is diffused to a plurality of beams in a rotating direction. Also, the present invention provides a construction machine control system as described above, wherein each of the laser beams is divided into a plurality of parts in a rotating direction, and an aspect of division is varied according to each of the laser beams. The present invention also provides a construction machine control system, wherein the level sensor comprises a photodetection status identifier for identifying a specific laser beam among the plurality of laser beams based on the aspect of photodetection of the laser beam. Also, the present invention provides a construction machine control system as described above, wherein the plurality of laser beams are emitted by a plurality of light emitting elements driven independently, and the light emitting elements can independently modulate or flash. Further, the present invention provides a construction machine control system as described above, wherein the laser beams are divided by diffraction patterns. The present invention provides a construction machine control system, comprising a rotary laser irradiating system disposed at a given position and for forming a predetermined laser reference plane by rotating and irradiating a laser beam, a photodetection unit mounted on the construction machine for detecting said laser reference plane, an identifying means for identifying said laser reference plane, a surveying system for detecting a horizontal position of the construction machine, a storage unit for storing working data and a program for calculating a vertical position of construction based on the position of said rotary laser irradiating system, the position of said construction machine and the photodetecting position of the identified laser reference plane detected by said photodetection unit, and a control device for comparing working data at said horizontal position which is detected by said surveying system with said calculated vertical position of construction, and having a program which controls the vertical position to be constructed by the construction machine based on the comparison. Also, the present invention provides a construction machine control system, wherein said rotary laser irradiating system forms a plurality of laser reference planes and each of laser beams which forms the laser reference planes is modulated differently. The present invention provides constructing method for a construction machine, comprising a step that a rotary laser irradiating system disposed at a given position forms a predetermined laser reference plane by rotating and irradiating a laser beam, a step that a photodetection unit mounted on the construction machine detects said laser reference plane, a step for identifying said laser reference plane, a step for detecting a horizontal position of the construction machine, a step that a program which a control device has calculates a vertical position of construction based on the position of said rotary laser irradiating system, the position of said construction machine and the photodetecting position of the identified laser reference plane, a step for comparing working data at said horizontal position with said vertical position of construction, and a step for controlling the vertical position to be constructed by the construction machine based on the result of the comparison. Also, the present invention provides constructing method for a construction machine, wherein said rotary laser irradiating system forms a plurality of laser reference planes and each of laser beams which forms the laser reference planes is modulated differently.

Using the rotary laser irradiating system of the present invention, it is possible to form a plurality of laser reference planes at the same time, to set different levels at a plurality of points, to carry out different ground leveling operations by a plurality of construction machines, and to perform level setting for each of the construction machines by the same rotary laser irradiating system and to prevent erroneous operation of the construction machines.

DETAILED DESCRIPTION OF THE PREFERRED EMBODIMENTS

In the following, description will be given on embodiments of the present invention referring to the attached drawings. In the figures, the same components shown in FIG. 15 are referred by the same symbol, and detailed description is not given here.

First, description will be given on a rotary laser irradiating system, which is used to simultaneously form a plurality of reference planes and can control a plurality of construction machines.

Figure 1:
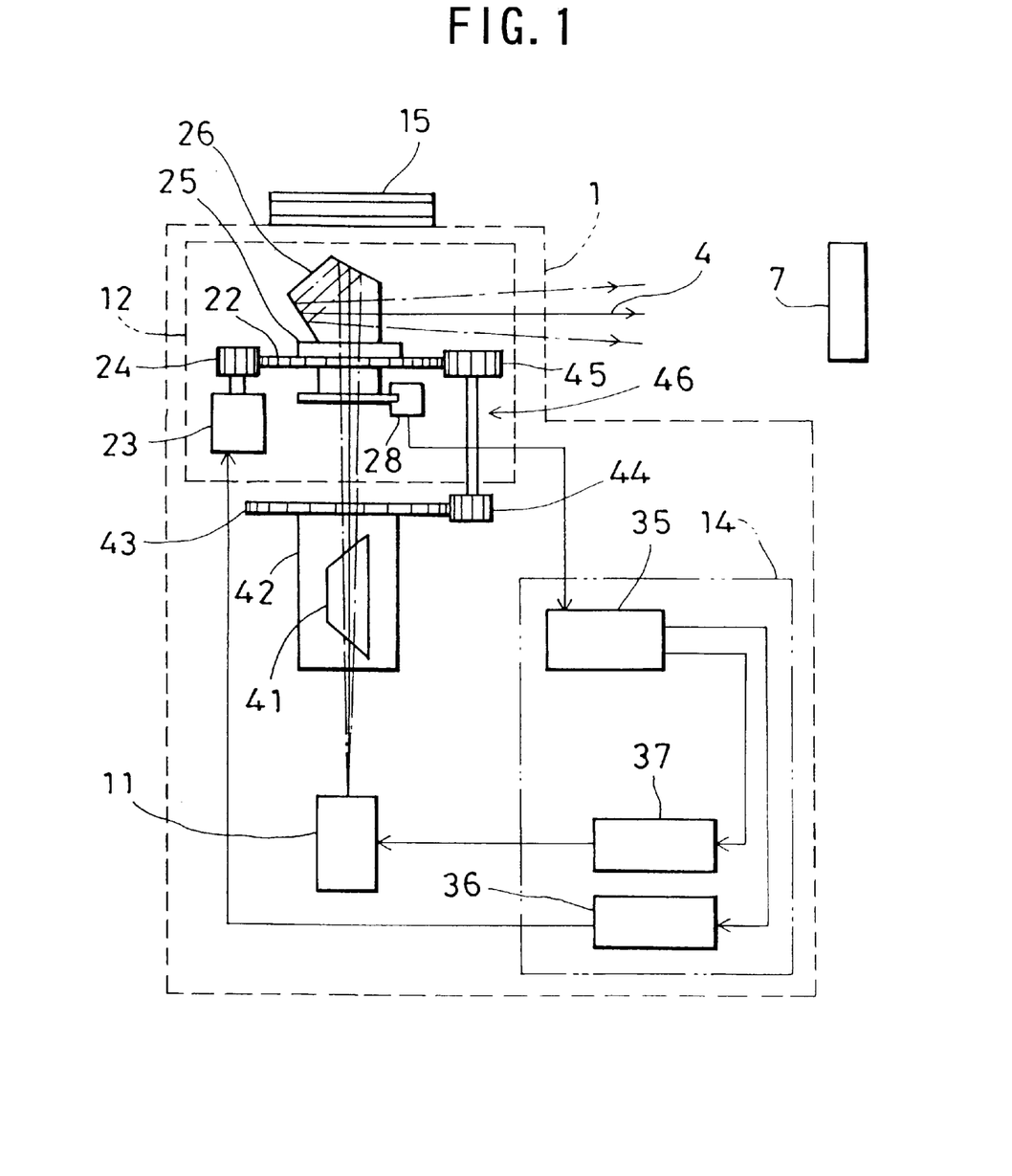
FIG. 1 is a block diagram to show a rotary laser irradiating system used for a construction machine control system according to the present invention.

FIG. 1 represents an essential portion of a rotary laser irradiating system 1, which comprises a light emitting unit 11 for irradiating a plurality of laser beams 4, a rotator 12 for projecting the laser beams 4 within a reference plane by rotary irradiation, and a control unit 14 for controlling rotation of the rotator 12 and light emitting condition of the light emitting unit 11. On the upper surface of the rotary laser irradiating system 1, a collimator 15 is provided, by which a direction of the rotary laser irradiating system 1 can be set with respect to the level sensor 7.

Figure 2:
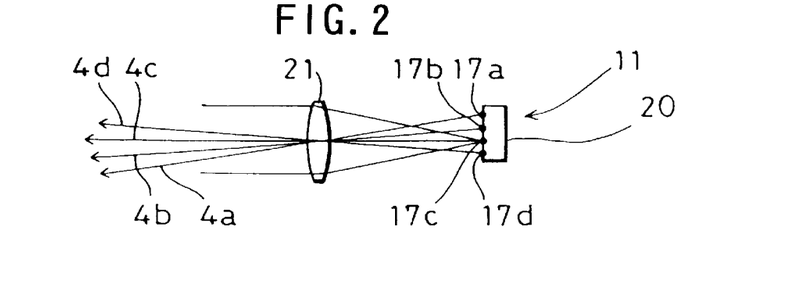
FIG. 2 is a drawing to explain a light emitting unit used for the rotary laser irradiating system.

The light emitting unit 11 comprises a light emitter 20 having as many laser diodes 17a, 17b, 17c and 17d as required (4 in the figure) arranged along a straight line and a collimation lens 21. The laser beams 4 emitted from the light emitter 20 are turned to parallel beams and are irradiated at a predetermined angle with respect to the optical axis.

On the optical axis of the collimation lens 21, an image rotator prism 41 is rotatably supported. The image rotator prism 41 has an effect to rotate the image two times by one turn. As to be described later, the image rotator prism 41 is connected to the rotator 12 in such manner that the rotation ratio will be 1:2.

Above the collimation lens 21, the rotator 12 is rotatably mounted so that it can be rotated around the optical axis of the collimation lens 21. On the rotator 12, a scanning gear 22 is disposed, and the scanning gear 22 is engaged with a driving gear 24 of a scanning motor 23, which is fixed on a frame (not shown) of the rotary laser irradiating system 1. When the driving gear 24 is driven, the rotator 12 is rotated via the scanning gear 22.

The scanning gear 22 is fixed on a rotating cylinder 25, which is rotatably supported. On the upper surface of the rotating cylinder 25, a pentagonal prism 26 is mounted. At a predetermined position on the rotating cylinder 25, an encoder 28 for detecting the direction of irradiation of the laser beams 4 is arranged.

The image rotator prism 41 is held by a prism holder 42, which is rotatably supported. On the prism holder 42, a synchronizing gear 43 is mounted, and an idle gear 44 is engaged with the synchronizing gear 43. An idle gear 45 is engaged with the scanning gear 22. The idle gear 45 and the idle gear 44 are fixed on the same shaft. A train of gears 46 is formed by the scanning gear 22, the idle gear 45, the idle gear 44, and the synchronizing gear 43 so that rotation ratio of the scanning gear 22 and the synchronizing gear 43 will be reduction ratio of 2:1.

Figure 3:
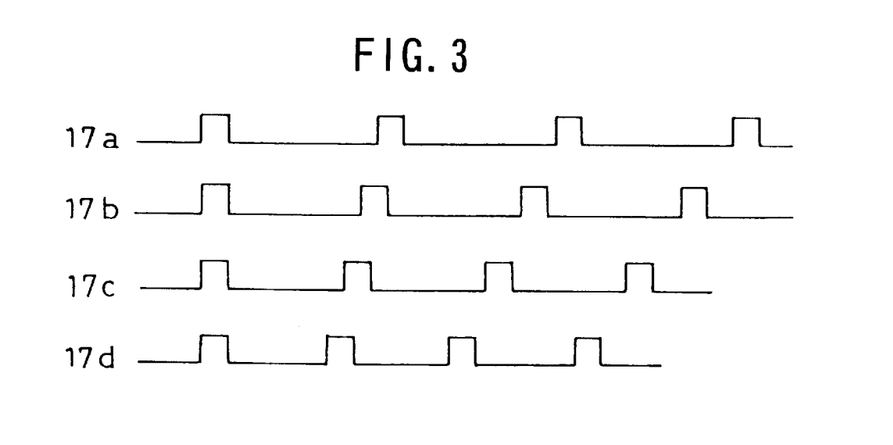
FIG. 3 is to explain condition of modulation of the laser beam emitted from the light emitting unit.

The control unit 14 primarily comprises an arithmetic unit 35, a scanning motor driving unit 36, and a light emitter driving unit 37. The arithmetic unit 35 controls the scanning motor driving unit 36 and drives the scanning motor 23 and controls the light emitter driving unit 37. The light emitter driving unit 37 modulates the laser diodes 17a, 17b, 17c and 17d to predetermined frequencies as shown in FIG. 3, and each of the laser diodes 17a, 17b, 17c and 17d can be flashed at a predetermined timing.

Laser beams 4a, 4b, 4c and 4d emitted respectively from the laser diodes 17a, 17b, 17c and 17d of the light emitter 20 are within a vertical plane. As already described, the scanning gear 22 and the synchronizing gear 43 are synchronously rotated with rotation ratio of 2:1 by the train of gear 46. As explained above, the image rotator prism 41 rotates the image two times by one turn. Thus, the optical axis of the light entering the pentagonal prism 26 is rotated at a ratio of 1:1 in synchronization with the rotation of the pentagonal prism 26. Regardless of the direction of the pentagonal prism 26, the laser beams 4 irradiated from the pentagonal prism 26 are deviated in upward or downward directions.

Figure 4:
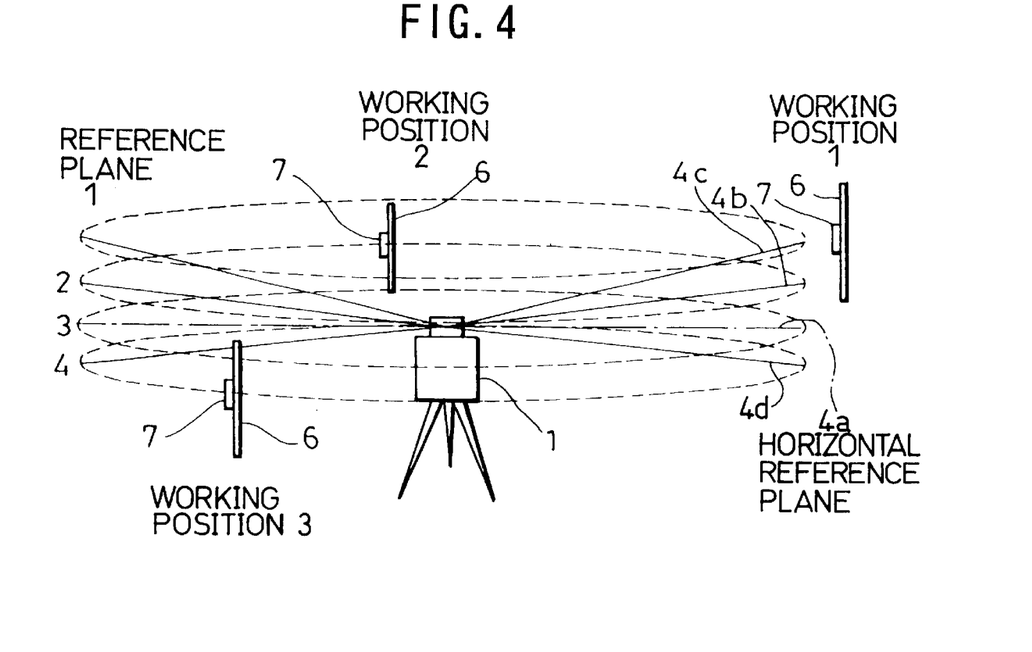
FIG. 4 is a drawing to explain an embodiment of the present invention.

When the laser beams 4 are emitted from the light emitter 20 and the scanning motor 23 is driven via the scanning motor driving unit 36, a plurality of conical reference planes are formed outside the horizontal reference plane by the plurality of laser beams 4a, 4b, 4c and 4d respectively as shown in FIG. 4. Further, if a filter or the like for detecting modulation of the laser beams 4a, 4b, 4c and 4d is arranged on the light receiving side, a specific beam among the laser beams 4 can be detected.

Figure 5:
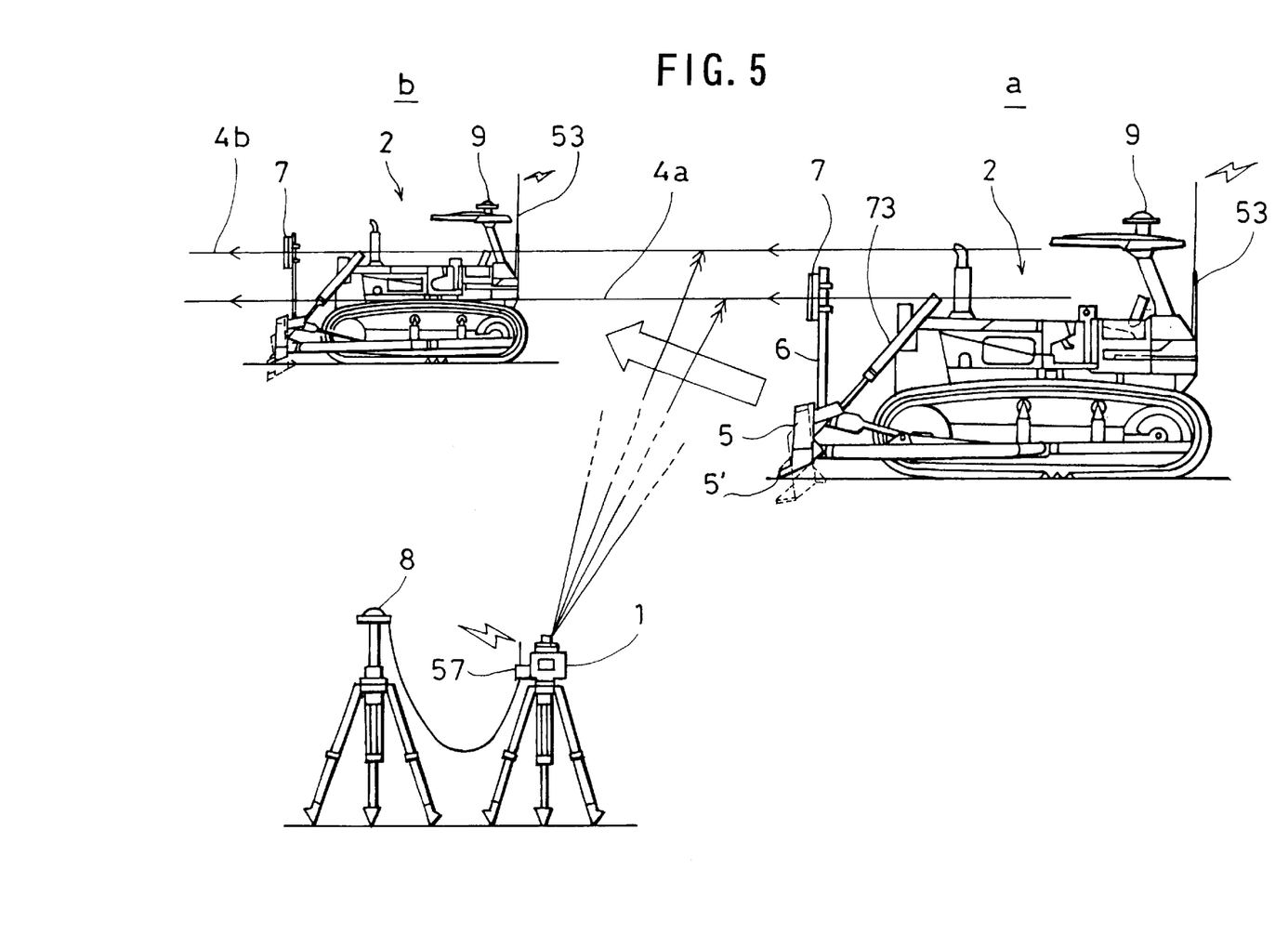
FIG. 5 is a drawing to explain an embodiment of the present invention.

Next, description will be given on a construction machine control system using the rotary laser irradiating system 1 as described above referring to FIG. 5 and FIG. 6. In FIG. 5, the same components as shown in FIG. 15 are referred by the same symbol.

Figure 6:
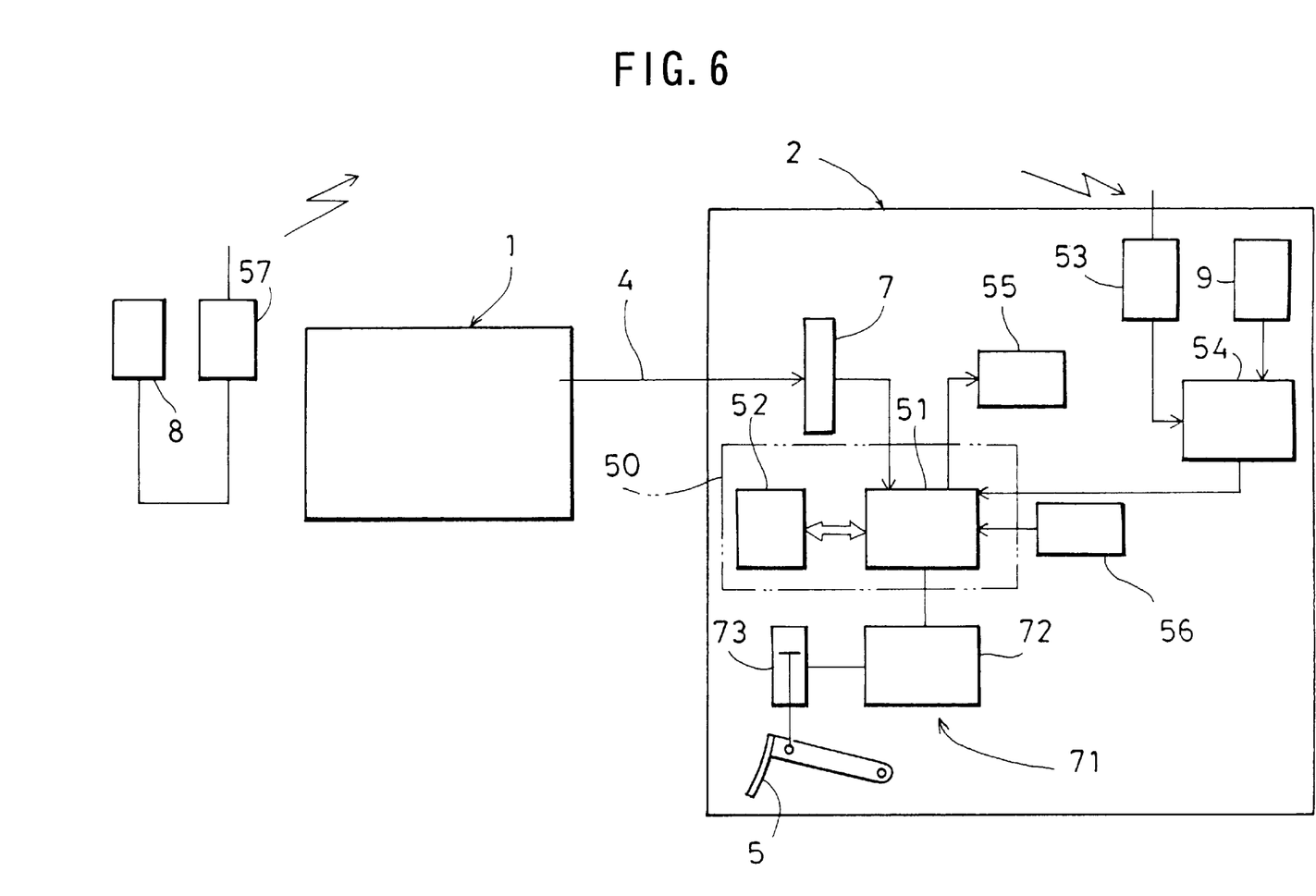
FIG. 6 is a block diagram of a construction machine control system according to the present embodiment.

On a bulldozer 2, there are provided a level sensor 7 capable to identify modulating condition of the laser beams 4a, 4b, 4c and 4d, a GPS antenna 9 arranged at a position such as roof of the bulldozer 2 where there is very few obstacle to interrupt electric wave from the satellite, a receiving unit 53 for receiving a signal from a GPS base antenna 8, a signal processing unit 54 for inputting the result of receiving at the receiving unit 53 and the GPS antenna 9 to a control unit 50 described later by amplifying or converting it to a predetermined signal form, a control device 50 for calculating the position of the bulldozer 2 based on position information signal from the signal processing unit 54 and for controlling the condition of construction work, a display unit 55 for displaying result of calculation of the control device 50 and construction condition, and an operation unit 56 for inputting data such as construction condition to the control device 50 or performing direct manual operation based on the display on the display unit 55. Also, there is provided a blade driving unit 71, which is controlled by the control device 50 and drives the blade 5.

A typical example of the control device 50 is a personal computer, and the control device 50 comprises an arithmetic unit 51 and a storage unit 52. In the storage unit 52, topographical data based on the working diagram, i.e. data of height of ground surface with respect to plane coordinates, are set and inputted, and position of the rotary laser irradiating system 1, identification data of the irradiating laser beams, height of the machine, and further, a distance up to a reference position of the level sensor 7 from the blade edge 5' are set and inputted. Further, an arithmetic program for associating positions of the bulldozer 2 and the rotary laser irradiating system 1 with topographical data, an arithmetic program for calculating height of the laser beam at the position of the bulldozer 2, and an arithmetic program for determining height of the blade by associating the height of the laser beam at the position with the topographical data are provided.

A signal from the GPS base antenna 8 is received by the receiving unit 53 via a radio transmitter 57, and it is inputted to the arithmetic unit 51 via the signal processing unit 54 together with the signal of the GPS antenna 9 as described above. The position of the bulldozer 2 can be calculated from the signal relating to the position inputted to the arithmetic unit 51 and by the arithmetic program. Because the rotary laser irradiating system 1 is at a fixed point and is not moved very frequently, if the position of the rotary laser irradiating system 1 is directly inputted, perfect control can be achieved even when the GPS base antenna 8 is not provided.

Figure 7:
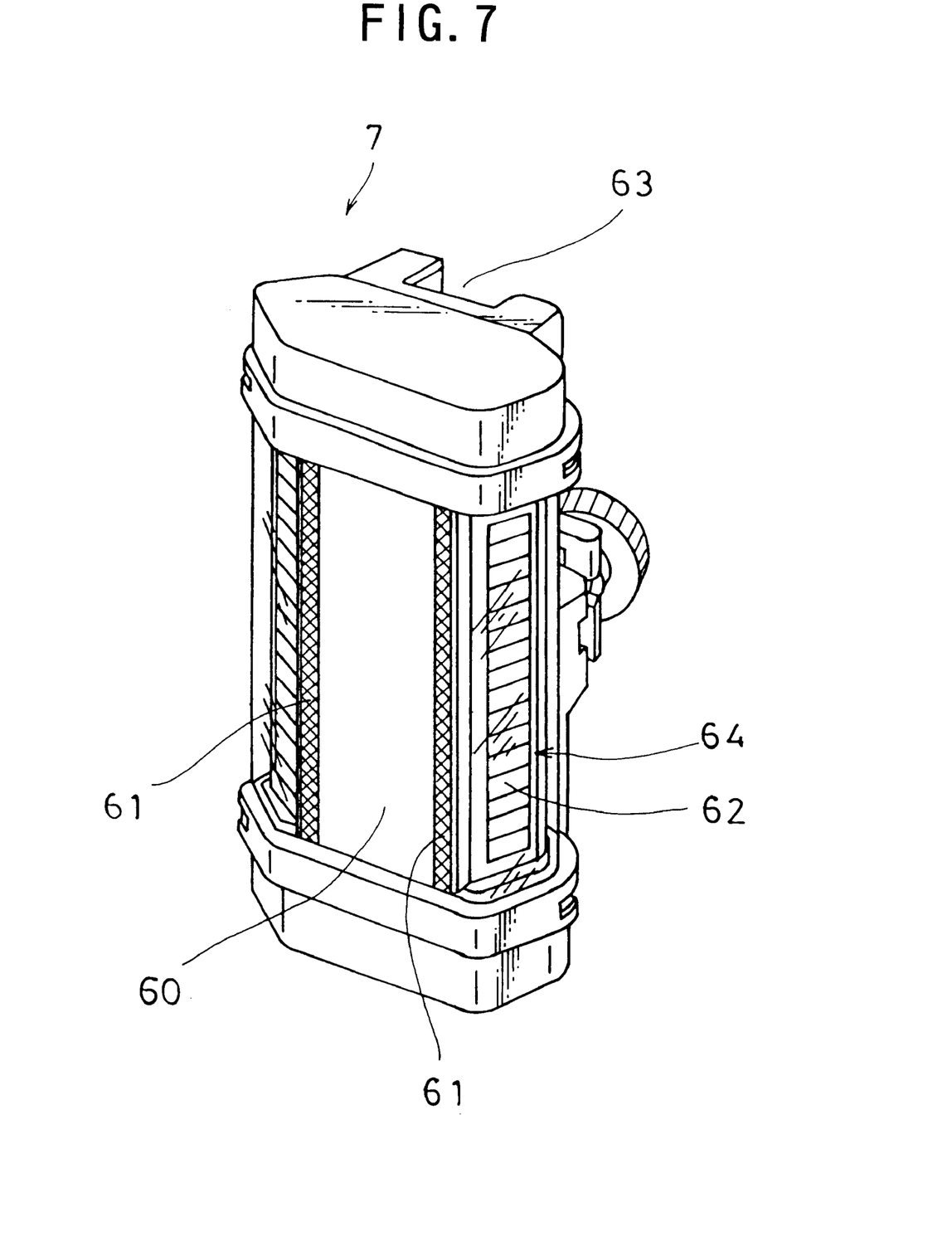
FIG. 7 is a perspective view of a level sensor used in the present invention.
Figure 8:
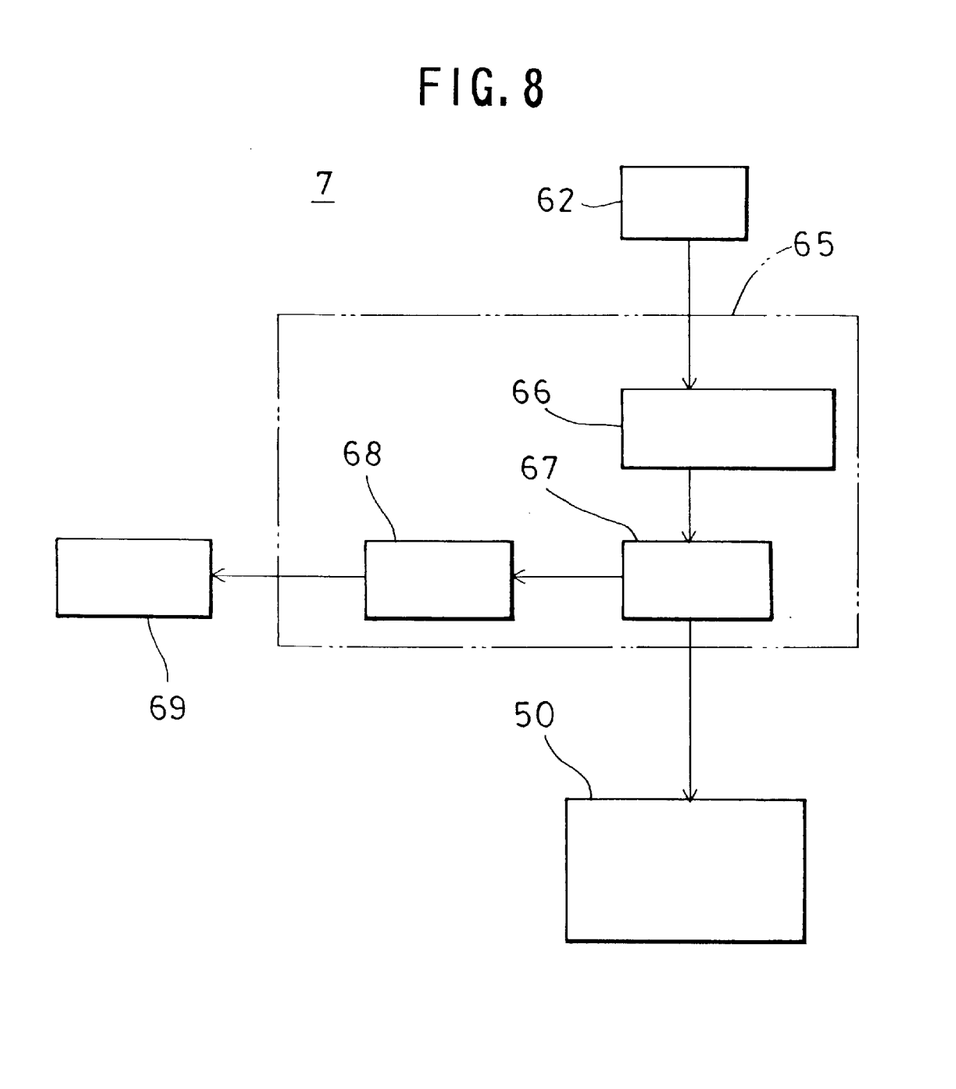
FIG. 8 is a block diagram of a photodetection status identifier provided on the level sensor.

Now, the level sensor 7 will be described referring to FIG. 7 and FIG. 8.

On each of left side and right side of a non-reflection sector 60, a band-like reflection sector 61 is disposed. On outer side of each of the reflection sectors 61, a photodetection unit 64 is provided, which comprises a photodetection element 62 extending in a vertical direction in band-like shape, and the photodetection unit 64 is mounted at an angle with respect to the reflection sector 61. On rear side, a groove 63 to be engaged with the pole 6 is formed, and the level sensor 7 is mounted with the pole 6 engaged in the groove 63. In case a reflection light detector and a direction detector are provided in the rotary laser irradiating system 1, initial direction can be set instead of the collimator 15 based on the reflection light from the reflection sector 61.

The level sensor 7 comprises a photodetection status identifier 65 for detecting only a specific laser beam among the laser beams 4a, 4b, 4c and 4d, and a display unit 69 (not shown in FIG. 7) to be driven by the photodetection status identifier 65. FIG. 8 schematically illustrates the photodetection status identifier 65.

A photodetection signal from the photodetection unit 64 is inputted to a photodetection signal detection circuit 66. The photodetection signal detection circuit 66 comprises signal processing circuits such as amplifier, electrical filter, etc. The signal from the photodetection signal detection circuit 66 is inputted to an arithmetic unit 67. The received signal is identified as one of the laser beams 4a, 4b, 4c or 4d. Further, it is identified at which position of the photo detection element 62 the one of the laser beams 4a, 4b, 4c or 4d is irradiated.

Based on the result of calculation, the arithmetic unit 67 offers an information relating to photodetection status to the display unit 69 via a display driving unit 68. Or, the calculation result is outputted to the control device 50.

Now, the blade driving unit 71 will be described.

The level sensor 7 is mounted on the pole 6, and the distance between the blade edge 5' of the blade 5 and the reference position of the level sensor 7 is a value already known. The detection signal of the laser beam 4 detected by the level sensor 7 is inputted to the arithmetic unit 51. Height of the blade edge 5' is calculated in the arithmetic unit 51, and the arithmetic unit 51 drives a hydraulic cylinder 73 via an electric/hydraulic circuit 72, moves the blade 5 up and down, and determines its position. The electric/hydraulic circuit 72 comprises an electromagnetic valve. The arithmetic unit 51 issues an open/close control command to the electric/hydraulic circuit 72 according to a predetermined sequence. By the electromagnetic valve which the electric/hydraulic circuit 72 opens or closes, supply or discharge of pressure oil to or from the hydraulic cylinder 73 is controlled or flow rate of pressure oil is adjusted, and the hydraulic cylinder 73 is moved up or down at a predetermined rate. On the display unit 55, a position of the blade 5 or an excavating status by the blade 5 is displayed.

Direct manual operation can be performed by the operation unit 56 according to the display of the display unit 55. While watching the display on the display unit 55, operator can determine the position of the blade 5. A signal from the operation unit 56 is inputted to the arithmetic unit 51, and the arithmetic unit 51 drives the hydraulic cylinder 73 via the electric/hydraulic circuit 72 according to the input signal.

Near the rotary laser irradiating system 1 and at a position serving as a reference point, the GPS base antenna 8 is installed. When signal is received by the GPS base antenna 8, a position of the bulldozer 2 is detected by GPS antenna 9 based on kinematic survey. The GPS base antenna 8, the GPS antenna 9 and the control device 50 constitute together a surveying system.

In the following, referring to FIG. 4 and FIG. 5, description will be given on operation when ground leveling operation is performed by the bulldozer 2 on a topographical condition where there are ground upheavals beyond the vertical photodetection range of the level sensor 7.

The GPS base antenna 8 is installed at a known point, and the rotary laser irradiating system 1 is also installed at a known point. The values of these known points are inputted as data to the control device 50.

After the installation, leveling of the rotary laser irradiating system 1 is performed. The positions of the rotary laser irradiating system 1 installed at a known point and the position of the bulldozer 2 are obtained by kinematic survey. From the data of the two positions thus obtained, relative position of the rotary laser irradiating system 1 and the bulldozer 2 on topographical data based on the working diagram is calculated by the arithmetic unit 51. The level sensor 7 fixed on the blade 5 of the bulldozer 2 with its position already known receives the laser beams 4, and ground leveling operation is performed according to the photodetecting position on the level sensor 7.

When ground leveling operation is carried out using a reference plane, the blade driving unit 71 is controlled in such manner that the photodetecting position detected by the level sensor 7 agrees with a photodetecting position taught by working data containing topographical data stored in the storage unit 52. In case the topographical condition to be leveled is changing beyond the range of the level sensor 7, the reference plane should be changed. For example, it is changed from a horizontal reference plane to a conical reference plane, and the difference from the working data is calculated, and the leveling work is continued. An exit angle of the laser beam as well as positions of the rotary laser irradiating system 1 and the bulldozer 2 on topographical data are detected. Based on these data, the blade driving unit 71 is controlled in such manner that the photodetecting position of the reference plane detected by the level sensor 7 agrees with the photodetecting position taught by the working data.

In case the operation goes on and the horizontal reference plane can receive the light again, operation is continued by replacing the conical reference plane with the horizontal reference plane. By identifying the reference plane which receives the light and by calculating the height of the blade at the ground point, comparison can be made easily between the height to be worked out according to the topographical data at that point and the calculated height. Further, in order that the operation can be continued regardless of the height of the topography, an exit angle of the conical reference plane is determined in such manner that the level sensor 7 can receive the light at least on one reference plane, and a plurality of reference planes are formed.

The blade driving unit 71 drives the hydraulic cylinder 73 via the electric/hydraulic circuit 72 and changes the vertical position of the blade 5. Because the level sensor 7 is arranged on the blade 5, the vertical change is represented as the change of photodetecting position of the level sensor 7. If the change in the photodetecting position of the level sensor 7 is fed back to the control device 50, ground leveling operation with high accuracy can be automatically performed.

For the position control of the blade 5, the blade driving unit 71 may be controlled directly by the control device 50. Or, the position control information of the blade 5 may be displayed on the display unit 55 so that an operator can manually operate the blade driving unit 71.

Referring to FIG. 5, ground leveling operation is performed at a point "a" based on the horizontal reference plane formed by the horizontal laser beam 4a. At the point "b", ground leveling operation is performed based on the conical reference plane formed by the laser beam 4b. An exit angle of the laser beam 4b with respect to the horizontal is fixed and has a known value. Further, the position of the rotary laser irradiating system 1 and the position of the bulldozer 2 at the point "b" are already known. Thus, from the laser beam 4b or from the laser beam 4a, the height can be calculated as described above. Therefore, even when the bulldozer 2 is moved to the point "b" and the laser beam 4a is no longer received, the ground leveling operation can be continued by receiving the laser beam 4b. Further, ground leveling operation can be performed on two horizontal planes at different levels using the laser beams 4a and 4b as reference.

Also, in case of ground leveling to form an inclined ground surface, operation is performed in such manner that the photodetecting position of the level sensor 7 agrees with the photodetecting position based on the working data. By selecting the laser beams 4a and 4b and by receiving light beam continuously, the inclined ground surface for wide range can be prepared without re-setting the rotary laser irradiating system 1. In case curved ground surface should be prepared, the above correction should be made to agree with the curved surface.

Further, gradient of the conical reference plane may be aligned with the gradient for the ground to be leveled in advance, and the position of the blade 5 may be controlled in such manner that the photodetecting position of the level sensor 7 comes to the predetermined position of the photo-detection element 62. Thus, an inclined ground surface can be prepared in accordance with the gradient of the conical reference plane.

Figure 9:
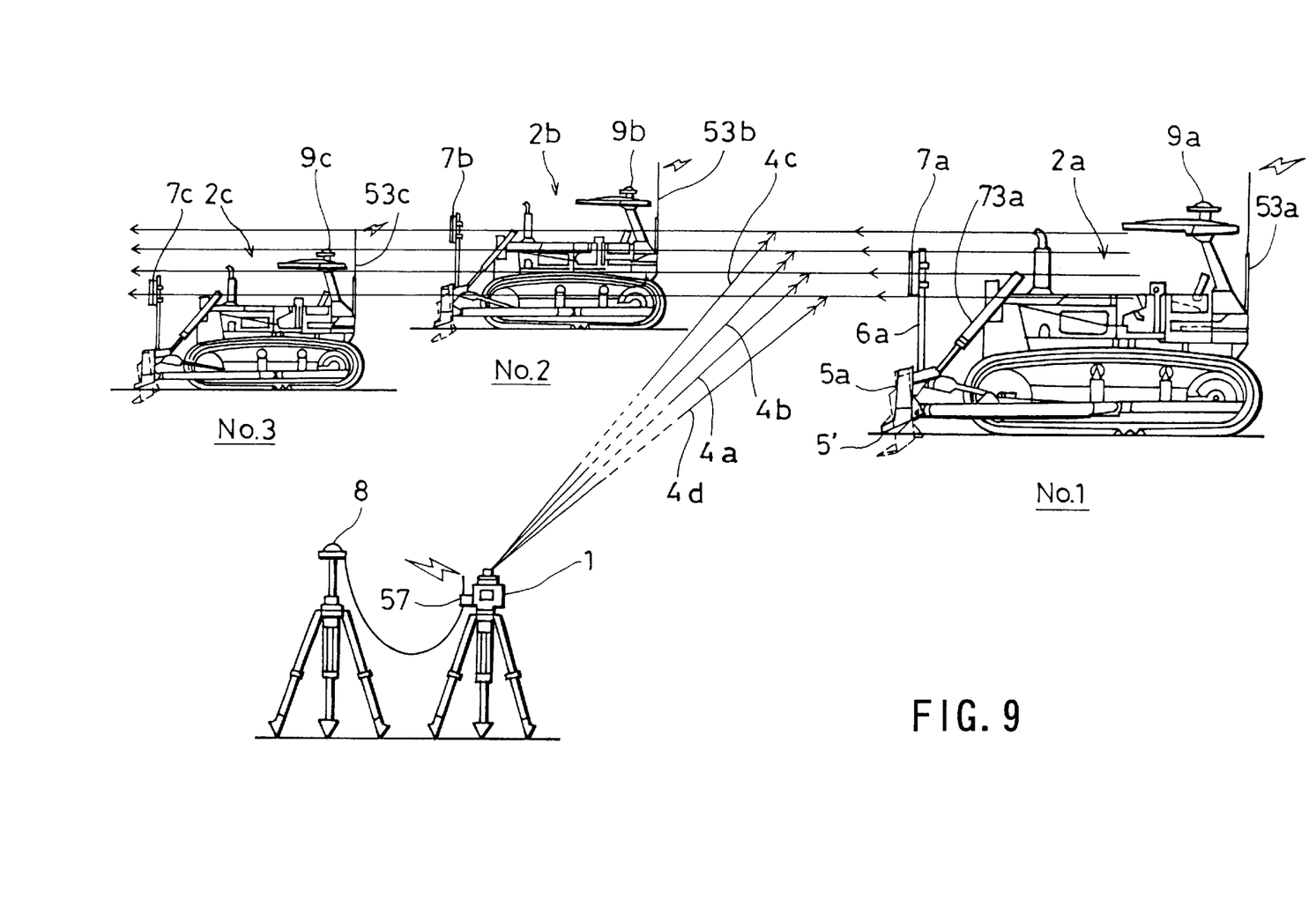
FIG. 9 is a drawing to explain an embodiment of the present invention used for a plurality of construction machines.

Next, description will be given on a case where different ground leveling operation is performed at the same time by a plurality of bulldozers 2a, 2b and 2c referring to FIG. 9.

The rotary laser irradiating system 1 simply emits reference light and control operation is carried out on the bulldozer side. Accordingly, even in case a plurality of bulldozers are controlled, it is basically the same as the control of a single bulldozer. Each of the bulldozers 2a, 2b and 2c detects and identifies each of the laser beams (4a, 4b, 4c and 4d), and the blade 5 is controlled via each of the blade driving unit 71 so that the photodetecting position of the laser beam agrees with the photodetecting position based on the working data.

The signals received by the GPS base antenna 8 and the GPS antennas 9a, 9b and 9c of the bulldozers 2a, 2b and 2c are inputted to the control devices 50a, 50b and 50c respectively from time to time via the signal processing units 54a, 54b and 54c. At each of the control devices 50a, 50b and 50c, relation between the position of each of the bulldozers 2a, 2b and 2c and the position of the rotary laser irradiating system 1 is surveyed at real time. The result of the survey is plane position information of each of the bulldozers 2a, 2b and 2c. Each of the control devices 50a, 50b and 50c controls position of each of the blades 5a, 5b and 5c for each of the bulldozers 2a, 2b and 2c based on the plane position information and on the working data stored in the storage unit 52.

Each of the bulldozers 2a, 2b and 2c can be moved independently and ground leveling operation can be carried out at different points at the same time. The separate ground leveling operation using the horizontal reference plane and the conical reference plane can be performed in the same manner as explained in connection with FIG. 5, and detailed description is not given here.

Using the present system, it is possible to perform ground leveling operation automatically in accordance with the working data. Also, based on the data displayed on the display unit 55, an operator can manually perform ground leveling operation.

Figure 10:
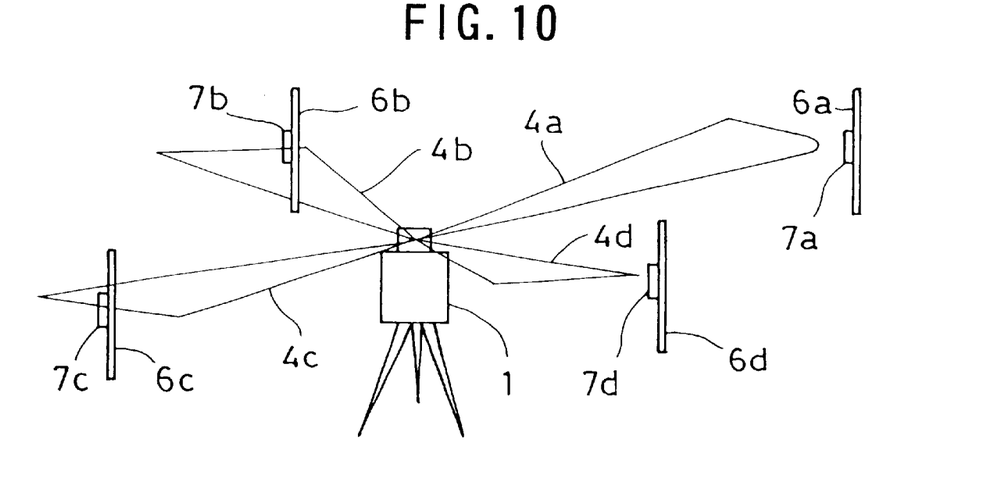
FIG. 10 is a drawing to explain an application example of an embodiment of the present invention when reference planes are partially formed.

In the above embodiment, the laser beams 4 are irradiated by total circumferential scanning. Because the range of ground leveling for each of the bulldozers 2a, 2b and 2c is limited, a reference plane may be formed within the range only corresponding to each of the bulldozers 2a, 2b, 2c, 2d as shown in FIG. 10. In this case, instead of lighting up the laser diodes 17a, 17b, 17c and 17d continuously at the same time, only one of the laser diodes 17 may be lighted up, which forms a reference plane of the level required by each of bulldozers 2a, 2b, 2c and 2d, and this contributes to the reduction of power consumption. In this case, communication means for notifying the positions of the bulldozer to the rotary laser irradiating system 1 is provided on the bulldozer 2 side. On the rotary laser irradiating system 1, control means is provided, which controls rotation of the scanning motor 23 and light emission of the light emitting unit 11 by calculating the direction of the bulldozer based on position information from the bulldozer 2. A rotating position of the rotary irradiation is obtained by the encoder 28.

Figure 11:
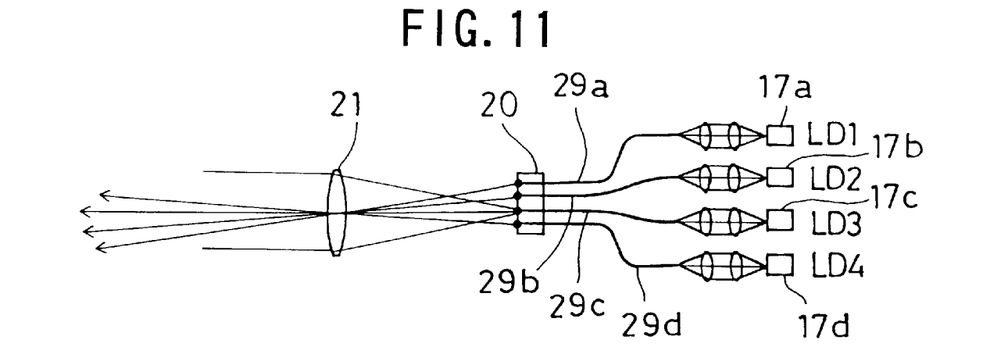
FIG. 11 is a drawing of an application example of an embodiment of the present invention, showing another example of the light emitting unit.

FIG. 11 shows a variation of the light emitting unit 11. In case there is no space for the laser diodes 17a, 17b, 17c and 17d in the light emitter 20, the laser diodes 17a, 17b, 17c and 17d may be arranged at other positions and a linear light emitter may be provided by connecting the laser diodes using optical fibers 29a, 29b, 29c and 29d.

Figure 12:
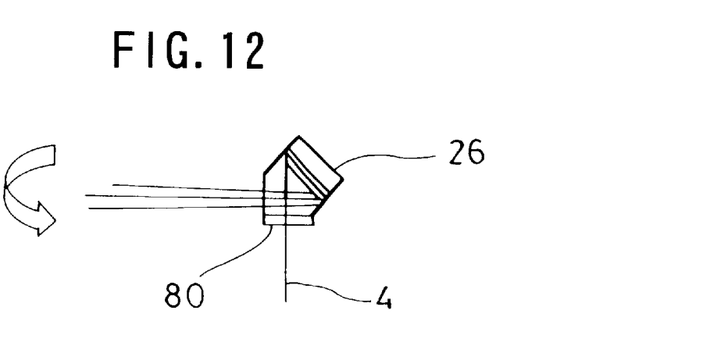
FIG. 12 is a drawing of an application example of an embodiment of the present invention, showing a case where the projected laser beam is diffused.

As described above, each of the laser beams 4 is modulated to have different frequencies in order to facilitate the identification of the plurality of laser beams 4. In case a pulse interval is longer than the passing time of the level sensor 7 because of the relation between frequency cycle and scanning rate of the laser beams, the level sensor 7 may not detect the laser beams 4. In such case, a cylinder lens 80 should be arranged on an incident side or an exit side of the pentagonal prism 26 as shown in FIG. 12 so that the laser beams 4a, 4b, 4c and 4d are diffused in the rotating direction and the laser beams are irradiated in fan-like shape. The laser beams are spread in the rotating direction, and this makes it possible to eliminate non-detection of the laser beams by the level sensor 7 even when the pulse interval is longer than the passing time of the level sensor 7.

Also, in the above embodiment, modulation is performed to have different frequencies for the laser beams 4a, 4b, 4c and 4d, while the laser beams 4 may be divided to two or more beams in the rotating direction and different dividing pattern may be given for each laser beam instead of modulating the laser beams.

When rotary scanning is performed using the laser beams thus divided, the photodetection signal issued from the level sensor 7 is turned to a signal specific for each laser beam, and this makes it possible to identify any one of the laser beams 4a, 4b, 4c and 4d from the signal pattern.

Figure 13:
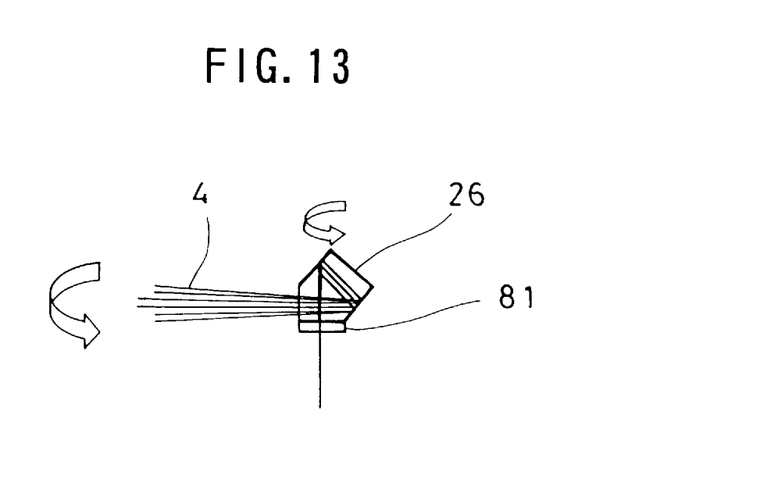
FIG. 13 is a drawing of an application example of an embodiment of the present invention, showing a case where the projected laser beam is divided in a rotating direction.

In the example shown in FIG. 13, a diffraction pattern 81 is arranged on a laser beam transmitting surface, and each of the laser beams 4a, 4b, 4c and 4d is divided into 3 parts in the rotating direction and different diffraction patterns are provided so that an aspect of division differs according to each of the laser beams 4a, 4b, 4c and 4d. The diffraction patterns 81 maybe provided not only on the transmitting surface but also on the reflecting surface.

Figure 14A:
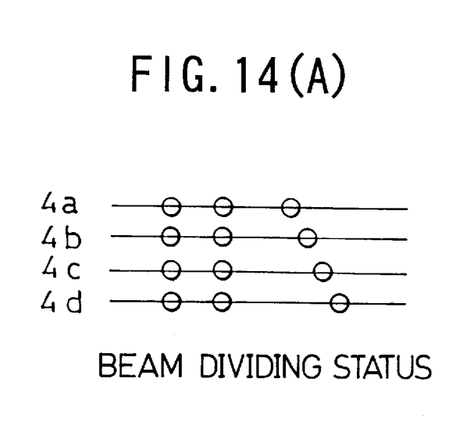
FIG. 14(A) and FIG. 14(B) represent an aspect of division of the laser beam in the above application example and an aspect of photodetection signals respectively.
Figure 14B:
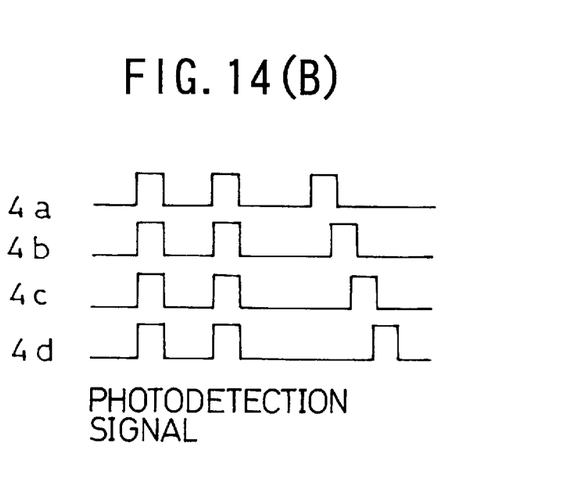

FIG. 14(A) shows an example of the aspect of division. Each of the laser beams 4 is divided into 3 parts, and the distance between the first divided laser beam and the intermediate divided laser beam is made the same for each of the laser beams 4a, 4b, 4c and 4d, while the distance between the intermediate divided laser beam and the last divided laser beam is increased one after another. As a result, in the photodetection signal shown in FIG. 14(B), the distance between the first pulse and the second pulse is the same for all of the laser beams 4a, 4b, 4c and 4d, while the distance between the second pulse and the third pulse is sequentially increased. Accordingly, by identifying pulse generating pattern, it is possible to identify each of the laser beams 4a, 4b, 4c and 4d.

In the above embodiment, the level sensor 7 is disposed on the blade 5, while the level sensor 7 can be mounted on the body of the bulldozer 2 if it is designed in such manner that the position of the blade edge 5' is detected from the stretching condition of the hydraulic cylinder or from the position of an arm to support the blade 5. In the above, description has been given on the global positioning system of kinematic type, while it is needless to say that global positioning system of any type may be used, which can immediately detect a moving point. The range of the level sensor 7 may be reciprocally scanned according to the output of the encoder 28, which detects a rotating position of the rotator 12, or the laser beams may be rotated by limiting the light irradiation only to the working range of the level sensor 7.

According to the construction machine control system of the present invention, it is possible to perform level setting within a plurality of limited range during one rotation, and this makes it possible to carry out civil engineering and construction work at a plurality of positions by a single rotary laser irradiating system. Also, when ground leveling operation is performed using a reference plane formed by laser beam, ground leveling operation can be performed not only for the horizontal ground surface but also for the inclined surface or the curved surface in easy and reliable manner without requiring a skilled operator, and the time required for the work can be reduced. Different types of ground leveling operation can be carried out at the same time by two or more construction machines, and level setting can be performed for each construction machine by the same rotary laser irradiating system, and erroneous operation of construction machine can be eliminated.

What is claimed is:

1. A construction machine control system, comprising a rotary laser irradiating system for irradiating a plurality of laser beams which can be identified and for irradiating by separating said plurality of laser beams in predetermined vertical angles and for forming a plurality of laser beam reference planes by rotating said plurality of laser beams, a construction machine having a ground leveling tool, a level sensor arranged on said ground leveling tool for receiving, detecting and identifying said plurality of laser beams, a driving unit for driving said ground leveling tool to adjust a height thereof, a control device for controlling said driving unit, and a GPS receiving system for detecting a position of said construction machine, wherein said control device controls said driving unit based on the position of said construction machine detected by said GPS receiving system, at least one photodetecting position of said plurality of laser beams which are received, detected and identified by said level sensor and position data of said rotary laser irradiating system.

2. A construction machine control system according to claim 1, wherein there is further provided topographical data incorporated in said control device and used for construction work, said control device associates the position of the construction machine and the position of said rotary irradiating system detected by said GPS receiving system with said topographical data, said control unit controls said driving unit based on the topographical data at the position of the construction machine, the photodetecting position of the laser beams which are received, detected and identified by said level sensor and position data of said rotary laser irradiating system.

3. A construction machine control system according to claim 1, further comprising a mobile side GPS receiving system for detecting a position of said construction machine, a fixed side GPS receiving system for detecting a position of said rotary laser irradiating system, transmitting means for transmitting position data of said rotary irradiating system detected by said fixed side GPS receiving system, and receiving means provided on said construction machine for receiving transmission from said transmitting means.

4. A construction machine control system according to claim 1, wherein each of said plurality of laser beams is modulated in a different manner so that said plurality of laser beams can be identified.

5. A construction machine control system according to claim 1, wherein each of said plurality of laser beams diffuses along a rotating direction so as to be detected by said level sensor.

6. A construction machine control system according to claim 1, wherein each of said plurality of laser beams is divided into a plurality of parts along a rotating direction so that said level sensor can identify said laser beams, and an aspect of division is varied according to each of the laser beams.

7. A construction machine control system according to claim 2, wherein said level sensor selects and continuously receives said plurality of laser beams, and said control unit controls said driving unit based on the result of receiving so that an inclined surface and a curved surface can be obtained corresponding to the working data.

8. A construction machine control system according to claim 1, wherein said plurality of laser beams are emitted by a plurality of light emitting elements driven independently, and said light emitting elements can independently modulate or flash.

9. A construction machine control system according to claim 6, wherein each of said plurality of laser beams are divided by diffraction patterns.

10. A construction machine control system, comprising a rotary laser irradiating system for irradiating a plurality of laser beams by separating said plurality of laser beams in a vertical direction and for forming a plurality of laser beam reference planes by said plurality of laser beams, a construction machine having a ground leveling tool, a level sensor arranged on said ground leveling tool for receiving and detecting said plurality of laser beams, a driving unit for driving said ground leveling tool to adjust a height thereof, a control device for controlling said driving unit, a mobile side GPS receiving system for detecting a position of said construction machine, a fixed side GPS receiving system for detecting a position of said rotary laser irradiating system, transmitting means provided on said fixed side GPS receiving system for transmitting a result of receiving on said fixed side GPS receiving system to said construction machine, and receiving means provided on said construction machine for receiving transmission from said transmitting means, wherein said control device detects the position of said construction machine by said GPS receiving system, said level sensor selects at least one of said plurality of laser beams and said control device controls said driving unit based on a laser beam photodetecting position of said level sensor, the position detected by said fixed side GPS receiving system, and the position detected by said mobile side GPS receiving system.

* * * * *